Dec. 15, 1925.  
H. H. BUSH  
1,565,547  
DERRICK ATTACHMENT TO MOTOR DRIVEN VEHICLES  
Filed May 7, 1924

INVENTOR.  
H. H. Bush,  
BY  
Geo. P. Kimmel  
ATTORNEY.

Patented Dec. 15, 1925.

1,565,547

UNITED STATES PATENT OFFICE.

HARRY H. BUSH, OF MIAMI, FLORIDA.

DERRICK ATTACHMENT TO MOTOR-DRIVEN VEHICLES.

Application filed May 7, 1924. Serial No. 711,731.

*To all whom it may concern:*

Be it known that I, HARRY H. BUSH, a citizen of the United States, residing at Miami, in the county of Dade and State of Florida, have invented certain new and useful Improvements in Derrick Attachments to Motor-Driven Vehicles, of which the following is a specification.

This invention relates to derrick operating devices for attachments for motor driven vehicles, more particularly to motor driven trucks, and has for one of its objects to simplify the construction, and increase the efficiency and utility of devices of this character.

With these and other objects in view the invention consists in certain novel features of construction as hereinafter shown and described and then specifically pointed out in the claim, and in the drawings illustrative of the preferred embodiment of the invention.

Figure 1:
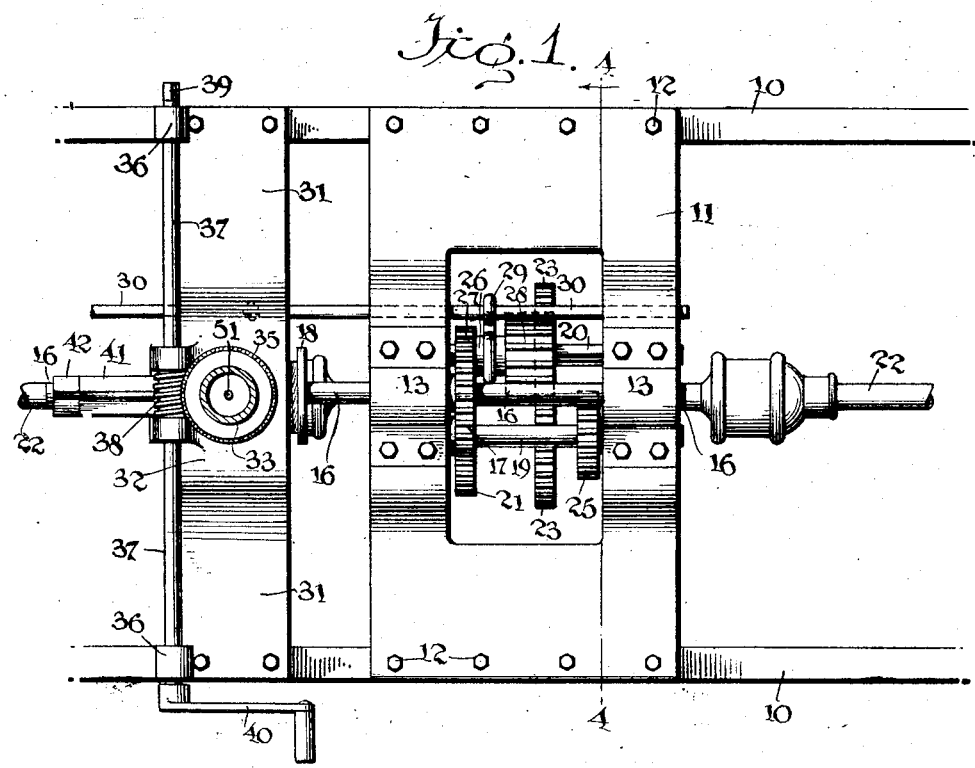
Figure 1 is a plan view of the operating mechanism with the derrick mast in transverse section.
Figure 2:
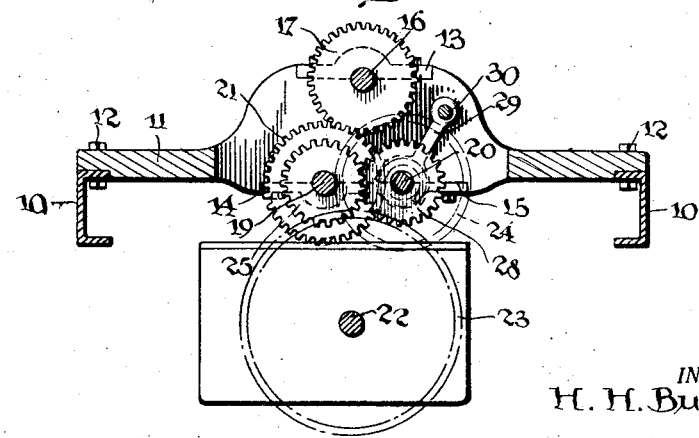
Figure 2 is a section on the line 4—4 of Figure 1, looking in the direction of the arrow.

The improved apparatus is supported on the side rails of the chassis or supporting frame of a motor driven truck, portions of which are represented conventionally at 10.

In many forms of auto trucks, the casing which encloses the transmission gearing is suspended from an open transverse frame intermediate the side frames 10, and the improved apparatus herein disclosed includes a similar transverse frame 11 bolted at the ends at 12 to the frame members 10. The frame 11 includes spaced sides each having a bearing 13 in the upper face and spaced bearings 14 and 15 in the lower face.

A shaft 16 is supported for rotation in the bearings 13, and is extended at one end rearwardly of the frame 11 and provided with a gear 17 and within the frame and a cable winding drum 18 on the extended portion.

A counter shaft 19 is mounted in the bearings 14, while a similar counter shaft 20 is mounted in the bearings 15, the counter shaft 20 being of other form than round, for instance square, as shown.

Mounted on the counter shaft 19 is a gear 21 in constant engagement with the gear 17 of the drumshaft 16.

A portion of the main drive shaft of the motor is represented at 22, and carries a master gear 23 within the frame members 11.

Mounted on the counter shaft 19 and spaced from the gear 21 is a smaller gear 25.

Slidably disposed on the square counter shaft 20 is a sleeve 26 carrying spaced gears 27 and 28, the latter having a relatively wide face as shown in Figure 1 and in constant engagement with the master gear 23. A shipper arm 29 engages the sleeve 26 and is attached to an operating rod 30 slidable through the frame 11 and conducted to a point convenient to the operator of the vehicle.

The gear 27 will engage the gear 21 when the sleeve 26 is at one end of its path, and the gear 28 will engage the smaller gear 25 when the sleeve is at the other end of its path, and when the sleeve is disposed at the center of its path, both gears 27 and 28 will be disconnected from both gears 21 and 25, or in neutral position. By this means when the sleeve is at one end of its path, high speed will be transmitted to the drum shaft 16, and slow speed will be imparted to the drum shaft when the sleeve is disposed at the other end of its path. The wide face of the gear causes it to be retained constantly in engagement with the main or master gear 23, but in intermittent engagement with the gear 25.

Supported upon the members 10 opposite the drum 18 is a base member 31 having an upwardly arching central portion 32 extending over the drum, and stepped upon the arching portion is a derrick mast 33, preferably tubular.

The mast 33 is rotatively supported upon the arched portion 32 as represented at 34, and is provided with a worm gear 35.

Supported in bearings 36 on the frame members 10 is an operating shaft 37, the latter carrying a worm pinion 38 constantly engaging the worm gear 35.

One or both ends of the shaft 37 is formed square as shown at 39 to receive a turning implement 40. Extending from the arching portion 32 is a hanger or bracket 41 and supporting a bearing 42 to receive one end of the shaft 16, and thus likewise support the drum 18.

A pull cable 51 is attached at one end to the drum 18 and is passed upwardly through the tubular mast 33 and adapted to operate a hoisting apparatus not shown, as it forms no part of the present invention.

The improved apparatus may be constructed of any suitable material or of any required size or capacity.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

A device of the class described comprising a main drive shaft, a driven shaft adapted to support a winding drum, a gear rotative with said driven shaft, coacting counter shafts in spaced relation, a master gear rotative with said drive shaft, spaced gears rotative with one of said counter shafts, one of which is in constant engagement with the gear of said driven shaft, a shipper sleeve rotative with the other counter shaft and slidable thereon, a gear rotative with said sleeve and adapted to be alternately engaged with and disengaged from the gear of said driven shaft, a gear having elongated teeth and in constant engagement with the master gear and adapted to be engaged with the other gear of the other counter shaft when the sleeve and its attached gears are adjusted longitudinally of the counter shaft with which they are rotative, and means for adjusting said sleeve.

In testimony whereof, I affix my signature hereto.

HARRY H. BUSH.